United States Patent
Li et al.

(10) Patent No.: US 11,416,967 B2
(45) Date of Patent: Aug. 16, 2022

(54) VIDEO PROCESSING METHOD, APPARATUS, DEVICE AND STORAGE MEDIUM

(71) Applicant: BEIJING BAIDU NETCOM SCIENCE AND TECHNOLOGY CO., LTD., Beijing (CN)

(72) Inventors: Chao Li, Beijing (CN); Shilei Wen, Beijing (CN); Errui Ding, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 91 days.

(21) Appl. No.: 17/024,253

(22) Filed: Sep. 17, 2020

(65) Prior Publication Data
US 2021/0209731 A1 Jul. 8, 2021

(30) Foreign Application Priority Data

Jan. 3, 2020 (CN) .......................... 202010005855.9

(51) Int. Cl.
*G06K 9/00* (2022.01)
*G06T 3/40* (2006.01)
(Continued)

(52) U.S. Cl.
CPC ............. *G06T 3/4046* (2013.01); *G06N 3/08* (2013.01); *G06T 3/4076* (2013.01); *G06T 7/13* (2017.01);
(Continued)

(58) Field of Classification Search
CPC ....... G06T 3/4046; G06T 3/4076; G06T 7/13; G06T 7/40; G06T 2207/10016;
(Continued)

(56) References Cited

U.S. PATENT DOCUMENTS

2019/0370608 A1    12/2019  Lee et al.
2021/0264568 A1*   8/2021   Shi ......................... G06N 3/084

FOREIGN PATENT DOCUMENTS

CN           104778659 A    7/2015
CN           106709875 A    5/2017
(Continued)

OTHER PUBLICATIONS

Jiang, Kui, et al. "Edge-enhanced GAN for remote sensing image superresolution." IEEE Transactions on Geoscience and Remote Sensing 57.8 (2019): 5799-5812. (Year: 2019).*

(Continued)

*Primary Examiner* — Jonathan S Lee
(74) *Attorney, Agent, or Firm* — Lathrop GPM LLP (57) ABSTRACT

Embodiments of the present disclosure provide a video processing method, a video processing device and a related non-transitory computer readable storage medium. The method includes the following. Frame sequence data of a low-resolution video to be converted is obtained. Pixel tensors of each frame in the frame sequence data are inputted into a pre-trained neural network model to obtain high-resolution video frame sequence data corresponding to the video to be converted output by the neural network model. The neural network model obtains the high-resolution video frame sequence data based on high-order pixel information of each frame in the frame sequence data.

18 Claims, 3 Drawing Sheets

(51) Int. Cl.
  *G06T 7/13* (2017.01)
  *G06N 3/08* (2006.01)
  *G06T 7/40* (2017.01)

(52) U.S. Cl.
  CPC ...... *G06T 7/40* (2013.01); *G06T 2207/10016* (2013.01); *G06T 2207/20081* (2013.01); *G06T 2207/20084* (2013.01)

(58) Field of Classification Search
  CPC . G06T 2207/20081; G06T 2207/20084; G06T 3/4053; G06T 5/50; G06N 3/08; G06N 3/0454; H04N 7/0117
  USPC ........................................................ 382/157
  See application file for complete search history.

(56) References Cited

FOREIGN PATENT DOCUMENTS

| | | |
|---|---|---|
| CN | 107578377 A | 1/2018 |
| CN | 108550115 A | 9/2018 |
| CN | 109272450 A | 1/2019 |
| CN | 109961396 A | 7/2019 |
| CN | 110473144 A | 11/2019 |

OTHER PUBLICATIONS

Chinese Patent Application No. 202010005855.9 First Office Action dated Jan. 6, 2021, 7 pages.
Chinese Patent Application No. 202010005855.9 English translation of First Office Action dated Jan. 6, 2021, 6 pages.

\* cited by examiner

VIDEO PROCESSING METHOD, APPARATUS, DEVICE AND STORAGE MEDIUM

CROSS REFERENCE TO RELATED APPLICATIONS

This application claims priority to Chinese Application No. 202010005855.9, filed on Jan. 3, 2020, the entire content of which is incorporated herein by reference.

TECHNICAL FIELD

The present disclosure relates to a field of data processing technologies, and more particularly, to a field of computer vision technologies.

BACKGROUND

Video super-resolution technology is used to convert a low-resolution video into a high-resolution video. A neural network model is generally used to convert the low-resolution video into the high-resolution video.

SUMMARY

Embodiments of the present disclosure provide a video processing method. The method includes:

obtaining frame sequence data of a low-resolution video to be converted; and inputting pixel tensors of each frame in the frame sequence data into a pre-trained neural network model to obtain high-resolution video frame sequence data corresponding to the video to be converted output by the neural network model, in which the neural network model obtains the high-resolution video frame sequence data based on high-order pixel information of each frame in the frame sequence data.

Embodiments of the present disclosure provide an electronic device. The device includes:

at least one processor; and a memory, communicatively connected to the at least one processor.

The memory is configured to store instructions executable by the at least one processor. When the instructions are executed by the at least one processor, the at least one processor is caused to execute the video processing method as described above.

Embodiments of the present disclosure provide a non-transitory computer-readable storage medium, having computer programs stored thereon. When the computer programs are executed, the computer is caused to execute the video processing method as described above.

Additional effects of the above-mentioned optional manners will be described below in combination with specific embodiments.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

In related arts, a neural network model is generally used to convert the low-resolution video into the high-resolution video. The neural network model simply uses a reconstructed pixel loss function as supervision information, resulting in excessive smooth of images and poor visual effects of the images.

Therefore, embodiments of the present disclosure provide a video processing method, a video processing apparatus, a video processing device and a storage medium, which will be described below, for the purpose of avoiding excessing smoothness of images after conversion, to make the image natural and improve the super-resolution visual effect.

Figure 1:
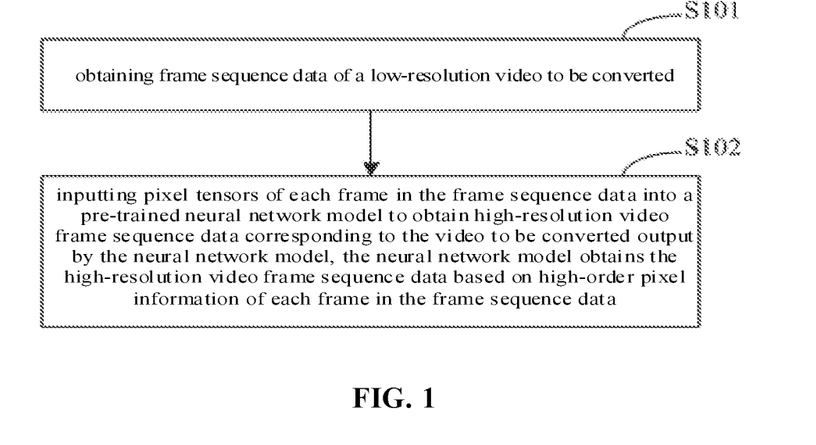
FIG. 1 is a flowchart illustrating a video processing method according to embodiments of the present disclosure.

FIG. 1 is a flowchart illustrating a video processing method according to embodiments of the present disclosure. Embodiments of the present disclosure are applicable for converting low-resolution videos into high-resolution videos. The method is executed by a video processing apparatus that is implemented by software and/or hardware and configured in an electronic device with certain data operating capability.

As illustrated in FIG. 1, the video processing method includes the following.

At block S101, frame sequence data of a low-resolution video to be converted is obtained.

The frame sequence data may be understood as a set of frames (images) contained in the video to be converted ordered in an order of displaying the video.

For example, the frame sequence data of the video to be converted may be pre-stored locally in the electronic device, in other storage devices associated with the electronic device, or in the cloud. The frame sequence data of the video to be converted may be directly obtained from the corresponding storage location when needed.

At block S102, pixel tensors of each frame in the frame sequence data are input into a pre-trained neural network model to obtain high-resolution video frame sequence data corresponding to the video to be converted output by the neural network model. The neural network model is configured to obtain the high-resolution video frame sequence data based on high-order pixel information of each frame in the frame sequence data.

The pixel tensors of each frame in the frame sequence data are input as input data into the pre-trained neural network model. The neural network model extracts the high-order pixel information of each frame in the frame sequence data, and based on the extracted high-order pixel information, converts the low-resolution video to be converted into the high-resolution video frame sequence data and outputs the high-resolution video frame sequence data.

The neural network model is trained in advance with frame sequence data of a large amount of low-resolution sample videos. In the trained neural network model, high-order pixel information may be extracted from the frame sequence data of the sample video in advance, and model parameters in the neural network model may be trained based on the extracted high-order pixel information. The model parameters may be continuously adjusted to so that a distance deviation between an output result of the model and real high-resolution frame sequence data corresponding to the sample video is gradually decreased to a stable value.

In an implementation of embodiments of the present disclosure, the high-order pixel information includes image edge and texture information of the frames in the frame sequence data. In an example, the image edge and texture information may be determined from a second derivative of each pixel point and neighbor pixel points in the frame image. The obtained second derivative information may be used as the high-order pixel information.

In an implementation in the above application, the structure of high-level pixel information is improved. By determining the second derivative information of each pixel point and neighbor pixel points in each frame of the video frame sequence data, the edge and texture information in the frame image are effectively extracted to provide data support for high-order pixel information.

For example, the second derivative information may be obtained by convolving the pixel tensors in width and height dimensions through a two-dimensional convolution kernel. The two-dimensional convolution kernel may be set by those skilled in the art according to requirements or experience values, or determined repeatedly through a large number of experiments.

It should be noted that, since in the present application, the high-order pixel information of each frame in the frame sequence data of the video to be converted is processed, the conversion from the low-resolution video to the high-resolution video is realized without using technologies such as optical flow or motion compensation. Thus data calculation amount in the video processing process is reduced, while degradation of the super-resolution effect caused by the introduction of additional errors is avoided.

In embodiments of the present disclosure, frame sequence data of the low-resolution video to be converted is obtained. The pixel tensors of each frame in the frame sequence data are input into the pre-trained neural network model. The neural network model obtains and outputs high-resolution video frame sequence data based on the high-order pixel information of each frame in the extracted frame sequence data, thereby converting the frame sequence data of the low-resolution video to be converted into high-resolution video frame sequence data. The above technical solution uses the high-order pixel information of the video when converting the video resolution, so that the neural network can effectively retain the image edge and texture information during the process of data processing, thereby realizing the fidelity of the edge and texture information and avoiding excessive smoothness of the images. Therefore, the image is more natural, and the super-resolution visual effect is improved.

Figure 2A:
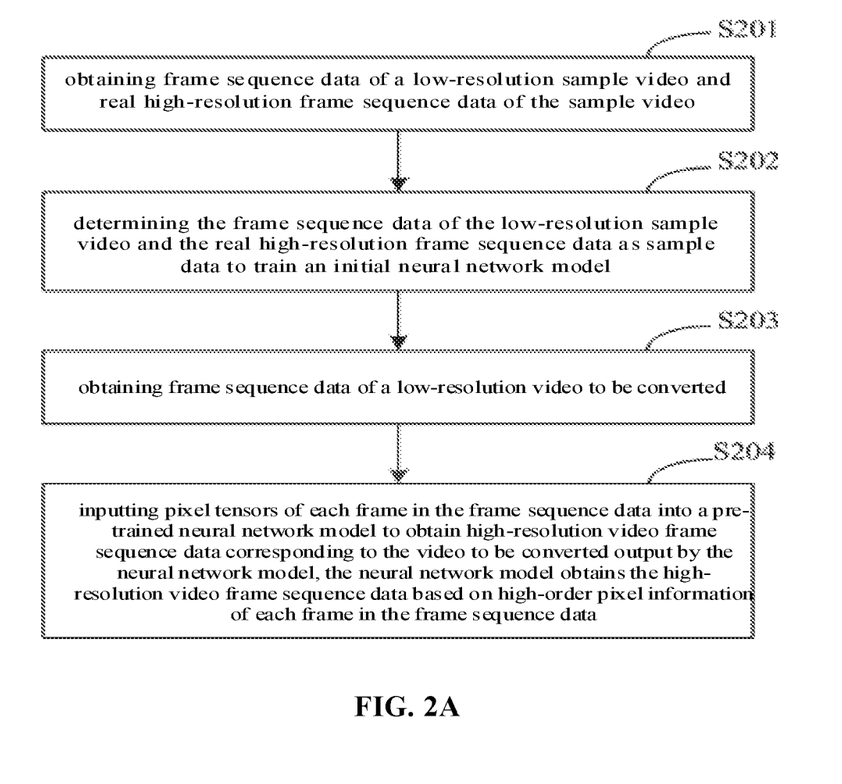
FIG. 2A is a flowchart illustrating a video processing method according to embodiments of the present disclosure.

FIG. 2A is a flowchart illustrating a video processing method according to embodiments of the present disclosure. The embodiments of the present disclosure are optimized and improved on the basis of the technical solutions of the foregoing embodiments.

Before the operation of "obtaining the frame sequence data of the low-resolution video to be converted", operations of "obtaining frame sequence data of a low-resolution sample video and real high-resolution frame sequence data of the sample video, and determining the frame sequence data of the low-resolution sample video and the real high-resolution frame sequence data of the sample video as sample data to train an initial neural network model" may be performed to improve a training mechanism of the neural network model.

As illustrated in FIG. 2A, the video processing method includes the following.

At block S201, frame sequence data of a low-resolution sample video and real high-resolution frame sequence data of the sample video are obtained.

At step S202, the frame sequence data of the low-resolution sample video and the real high-resolution frame sequence data of the sample video are determined as sample data to train an initial neural network model.

In an implementation of embodiments of the present disclosure, the model parameters of the neural network model are trained through the frame sequence data of the low-resolution sample video. By continuously adjusting values of the model parameters, the distance deviation between the frame sequence data output by the model and the real high-resolution frame sequence data is gradually decreased until the distance deviation becomes stable. Therefore, the trained neural network model is obtained.

Figure 2B:
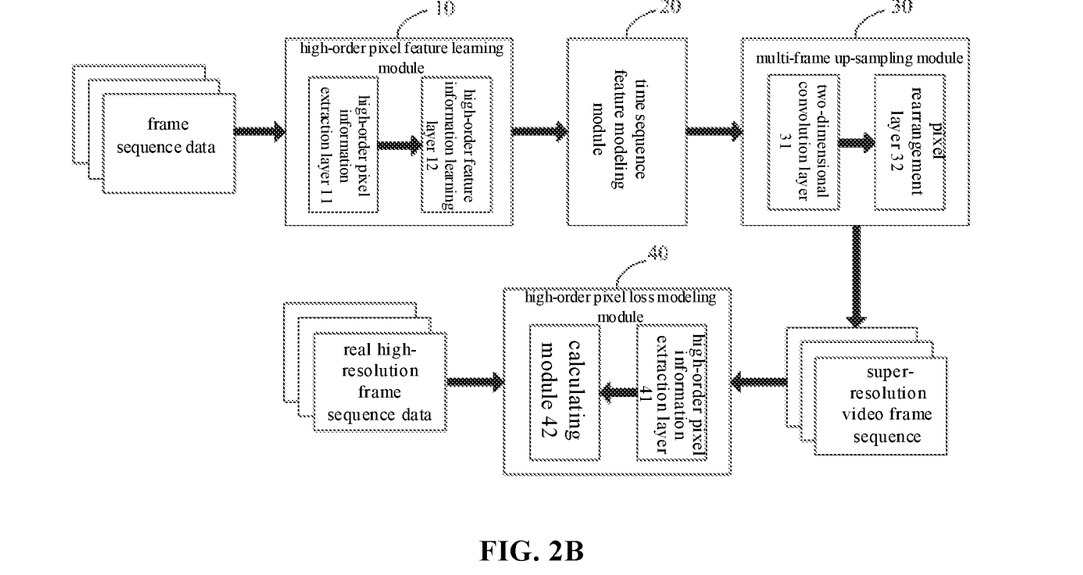
FIG. 2B is a diagram illustrating a structure of an initial neural network model according to embodiments of the present disclosure.

FIG. 2B is a diagram illustrating a structure of an initial neural network model. The initial neural network model includes: a high-order pixel feature learning module 10, a time sequence feature modeling module 20, a multi-frame up-sampling module 30, and a high-order pixel loss modeling module 40 connected in sequence.

For example, the high-order pixel feature learning module 10 is configured to calculate high-order pixel information of each frame based on pixel tensors of each frame in the frame sequence data of the sample video, and to obtain feature tensors of each frame in the frame sequence data of the sample video according to the high-order pixel information and the pixel tensors.

In order to achieve effective isolation of different functions of the high-order pixel learning module 10, the high-order pixel learning modules 10 may be divided by setting data layers. In detail, the high-order pixel feature learning module 10 includes a high-order pixel information extraction layer 11 and a high-order feature information learning layer 12. The high-order pixel information extraction layer 11 is configured to calculate the high-order pixel information of each frame based on the pixel tensors of each frame in the frame sequence data of the sample video, such that the extraction of high-order features in the frame sequence data of the sample video is achieved. The high-order feature information learning layer 12 is configured to perform nonlinear transformation on high-order pixel tensors composed of the high-order pixel information and on the pixel tensors to obtain feature tensors of each frame in the frame sequence data of the sample video. Therefore, non-linear information is introduced into the extracted high-order features, so as to realize deep mining of the extracted high-order features and highlight the representativeness and accuracy of the extracted feature information for the purpose of preparation for quality improvement on pixel quality of the converted video.

In an example, the high-order pixel information extraction layer 11 is provided with at least one two-dimensional convolutional layer having determined convolution weights, to perform calculation operations on high-order pixel information to extract high-order features, thereby reducing the feature dimension. Typically, the high-order pixel information of each frame is obtained by performing a convolution operation on the pixel tensors of each frame in the frame sequence data of the sample video in the width and height dimensions with the second-order convolution kernel. The second-order convolution kernel may be set by those skilled in the art according to requirements or experience values, and may be determined repeatedly through a large number of experiments.

Typically, when calculating the high-order pixel information, the second-order convolution kernel used is:

$$\begin{bmatrix} 0 & -1 & 0 \\ -1 & 4 & -1 \\ 0 & -1 & 0 \end{bmatrix}.$$

In an example, the high-order feature information learning layer 12 is provided with at least one three-dimensional convolution layer having convolution weights that need to be determined through training to map the extracted high-order pixel information to a high-dimensional space.

In an implementation in the above application, by dividing the high-order pixel feature learning module into the high-order pixel information extraction layer for extracting the high-order pixel information and the high-order feature information learning layer for performing the non-linear transformation, effective isolation of these two parts may be achieved. Meanwhile, non-linear details may be introduced in the extracted features including high-order information such as edge and texture information to realize further mining of feature information, thereby making the extracted feature information more representative, and laying a foundation for high fidelity of edge and texture information of high-resolution videos.

For example, the time sequence feature modeling module 20 is configured to perform feature transformation, in a time dimension, on the feature tensors of each frame in the frame sequence data of the sample video, to enable the time sequence feature of each frame after the transformation to be referred to adjacent frames.

In an example, the time sequence feature modeling module 20 is provided with at least one three-dimensional convolution layer, and is configured to perform a convolution operation on the feature tensors of each frame in the frame sequence data of the sample video, so as to achieve the purpose of modeling time sequence information.

For example, the multi-frame up-sampling module 30 is configured to scale up each frame in the frame sequence data of the sample video based on transformed feature tensors of each frame in the frame sequence data of the sample video to obtain a super-resolution video frame sequence of the sample video.

In an example, the multi-frame up-sampling module 30 is provided with at least one two-dimensional convolution layer 31 whose convolution weights need to be determined through training and a pixel rearrangement layer 32. The two-dimensional convolution layer 31 is configured to scale up the transformed, in the time dimension, feature tensors of each frame in the frame sequence data of the input sample video, so that the width and height of each output frame are r (r>1) times the size of the frame sequence data of the sample video. The pixel rearrangement layer 32 is configured to rearrange the pixels of the scaled frame sequence data output by the two-dimensional convolution layer 31, convert the pixels from the feature dimension to the spatial dimension, and obtain a super-resolution video frame sequence whose size is r times the size of the sample video. The resolution of the super-resolution video frame sequence is greater than that of the sample video, in which r may be set by those skilled in the art according to requirements or experience values.

For example, the high-order pixel loss modeling module 40 is configured to obtain first high-order pixel information of each frame in the super-resolution video frame sequence and second high-order pixel information of each frame in the real high-resolution frame sequence data respectively, and to adjust network parameters to be learned of the neural network model according to a first error (e.g. a first mean square error) between the first high-order pixel information and the second high-order pixel information, and a second error (e.g. a second mean square error) between the pixel tensors of each frame in the super-resolution video frame sequence and the pixel tensors of each frame in the real high-resolution frame sequence data. In detail, the first error and the second error both being less than a preset threshold are taken as a learning purpose.

In an example, the high-order pixel loss modeling module 40 includes the high-order pixel information extraction layer 41 and a calculating module 42. The high-order pixel information extraction layer 41 is configured to determine first high-order pixel information of each frame in the super-resolution video frame sequence and second high-order pixel information of each frame in the real high-resolution frame sequence data. The calculating module 42 is configured to calculate the first error between the first high-order pixel information and the second high-order pixel information, and the second error between the pixel tensors of each frame in the super-resolution video frame sequence and the pixel tensors of each frame in the real high-resolution frame sequence data. According to the first error and the second error, the network parameters to be learned in the neural network model are adjusted.

It is understood that, in order to avoid code redundancy in the neural network module, the high-order pixel information extraction layer 41 in the high-order pixel loss modeling module 40 may output the high-order pixel information directly by multiplexing (reusing) the higher-order pixel information extraction layer 11 in the high-order pixel feature learning module 10.

It should be noted that when the calculating module 42 adjusts the network parameters to be learned in the neural network model, the process may be implemented with the aid of gradient descent algorithm, so that both the first error and the second error may be gradually decreased and tend to be stabilized.

It is understood that in the process of training the neural network model, the first error and the second error calculated by the calculating module 42 may be used to evaluate the model performance of the trained neural network model.

In an implementation in the above application, by refining the neural network model and functions of each component, the data processing mechanism of the neural network model is improved to ensure that the high-order pixel feature learning module, the timing feature modeling module, the multi-frame up-sampling module and the high-order pixel loss modeling module that are connected in sequence may achieve the effect of converting the low-resolution video to the high-resolution video, while ensuring the fidelity of the edges and textures of images after the conversion, and making the images natural.

In an implementation of the embodiments of the present disclosure, in order to further improve the conversion accuracy of the neural network model for video resolution conversion, the neural network model illustrated in FIG. 2B may be further optimized and improved.

Figure 2C:
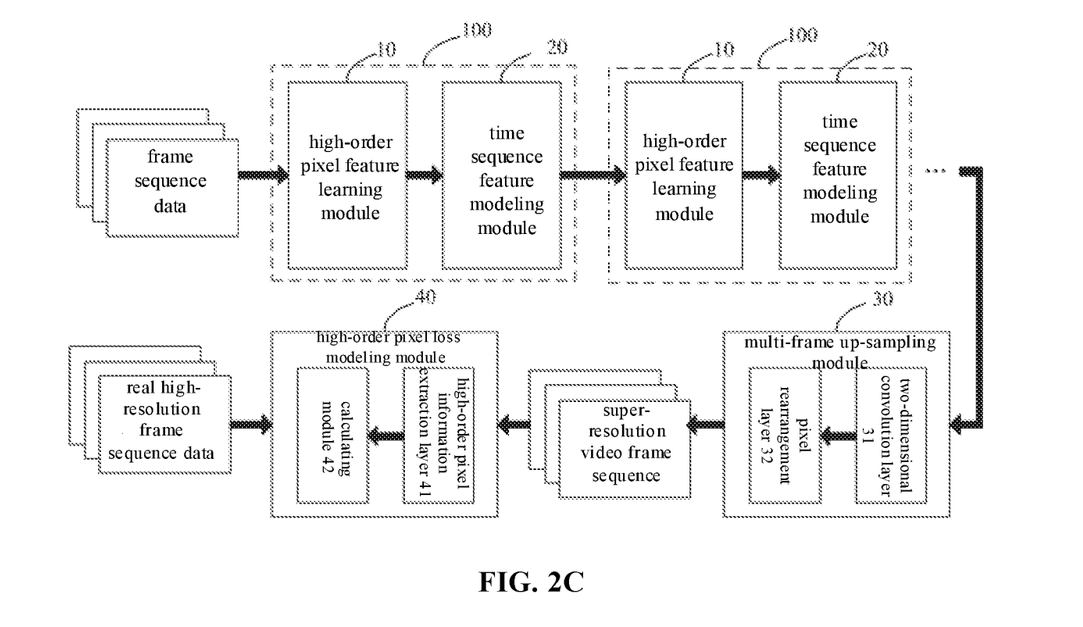
FIG. 2C is a diagram illustrating a structure of an improved neural network model over the initial neural network model according to embodiments of the present disclosure.

FIG. 2C is a diagram illustrating a structure of an improved neural network model over the initial neural network model. The neural network model includes multiple composite modules 100. Each composite module 100 includes a high-order pixel feature learning module 10 and a time sequence feature modeling module 20 connected in sequence. The multiple composite modules 100 are connected in sequence. The time sequence feature modeling module 20 of a last composite module 100 is connected to the multi-frame up-sampling module 30.

In optional implementation in the above application, by sequentially connecting the high-order pixel feature learning modules and the time sequence feature modeling modules between the time sequence feature modeling module and the multi-frame up-sampling module, the accuracy of the extracted feature information may be improved, and a foundation may be laid for high fidelity of the edge and texture information of the high-resolution video.

The high-order pixel feature learning module 10 and the time sequence feature modeling module 20 of the first composite modules 100 in the neural network model are used to convert the pixel tensors of each frame in the frame sequence data of the input video into feature tensors, in order to realize the feature extraction and conversion of the frame sequence data of the input video. Other composite modules 100 sequentially connected after the first composite module 100 in the neural network model are used to further learn the transformed feature tensors, in order to improve the accuracy of the learned feature tensors, thereby improving the accuracy of the neural network model.

At block S203, frame sequence data of a low-resolution video to be converted is obtained.

At block S204, pixel tensors of each frame in the frame sequence data are input into a pre-trained neural network model to obtain high-resolution video frame sequence data corresponding to the video to be converted output by the neural network model. The neural network model is configured to obtain the high-resolution video frame sequence data based on the extracted high-order pixel information of each frame in the frame sequence data.

When using the neural network model that is trained according to the technical solution of any of the above embodiments, the used neural network model is similar to the neural network model constructed in the training phase. Since there is no need to adjust the model parameters in the neural network model while using the model, the trained neural network model only includes the sequentially connected high-order pixel feature learning modules, time sequence feature modeling modules, and multi-frame up-sampling modules, without the high-order pixel loss modeling modules.

In an implementation of the embodiments of the present disclosure, when using the trained neural network model to process the frame sequence data of the low-resolution video to be converted, the processing operations performed by different modules on the frame sequence data are as follows.

The high-order pixel feature learning module is configured to calculate the high-order pixel information of each frame based on pixel tensors of each frame in the frame sequence data of the video to be converted, and to obtain feature tensors of each frame in the frame sequence data of the video to be converted according to the high-order pixel information and the pixel tensors.

For example, the high-order pixel feature learning module includes a high-order pixel information extraction layer and a high-order feature information learning layer. The high-order pixel information extraction layer is configured to calculate the high-order pixel information of each frame based on the pixel tensors of each frame in the frame sequence data of the video to be converted, to realize the extraction of high-order features in the frame sequence data of the video to be converted. The high-order feature information learning layer is configured to perform nonlinear transformation on high-order pixel tensors composed of the high-order pixel information and on the pixel tensors to obtain the feature tensors of each frame in the frame sequence data of the video to be converted. Therefore, non-linear information is introduced into the extracted high-order features, so as to realize deep mining of the extracted high-order features and highlight the representativeness and accuracy of the extracted feature information for the purpose of preparation for quality improvement on pixel quality of the converted video.

The time sequence feature modeling module is configured to perform feature transformation on the feature tensors of each frame in the frame sequence data of the video to be converted in a time dimension, so that the time sequence feature of each frame after the transformation is referred to adjacent frames.

The multi-frame up-sampling module is configured to scale up each frame in the frame sequence data of the sample video based on transformed feature tensors of each frame in the frame sequence data of the video to be converted to obtain a high-resolution video frame sequence of the video to be converted.

In an implementation in the above application, by clarifying the connection relation between the various modules within the trained neural network model, and improving the processing mechanism of the corresponding information of the video to be converted by different modules, the conversion from a low-resolution video to be converted to a high-resolution video is guaranteed.

For example, the multi-frame up-sampling module is provided with at least one two-dimensional convolution layer whose convolution weights need to be determined through training and a pixel rearrangement layer. The two-dimensional convolution layer is configured to scale up the transformed, in the time dimension, feature tensors of each frame in the frame sequence data of the video to be converted, so that the width and height of each output frame are r (r>1) times the size of the frame sequence data of the sample video. The pixel rearrangement layer is configured to rearrange the pixels of the scaled frame sequence data output by the two-dimensional convolution layer, convert the pixels from the feature dimension to the spatial dimension, and obtain a high-resolution video frame sequence whose size is r times the size of the video to be converted.

In embodiments of the present disclosure, before obtaining the frame sequence data of the low-resolution video to be converted, the neural network model is trained. In detail, the frame sequence data of the low-resolution sample video and the real high-resolution frame sequence data of the sample video are used as the sample data to train the initial neural network model to obtain the trained neural network model to provide guarantee for the high-resolution conversion of the video to be converted.

Figure 3:
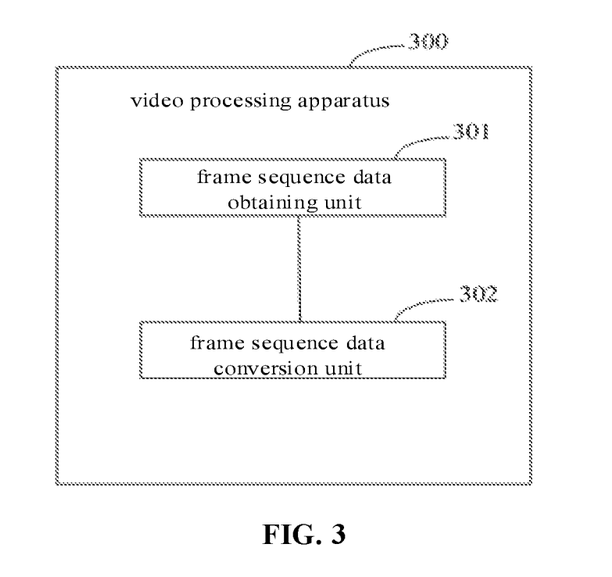
FIG. 3 is a diagram illustrating a video processing apparatus according to embodiments of the present disclosure.

FIG. 3 is a diagram illustrating a video processing apparatus according to embodiments of the present disclosure. Embodiments of the present disclosure are applicable for converting low-resolution videos into high-resolution videos. The device is implemented by software and/or hardware and is configured in an electronic device with certain data computing capabilities.

As illustrated in FIG. 3, a video processing apparatus 300 includes: a frame sequence data obtaining unit 301 and a frame sequence data conversion unit 302.

The frame sequence data obtaining unit 301 is configured to obtain frame sequence data of a low-resolution video to be converted.

The frame sequence data conversion unit 302 is configured to input pixel tensors of each frame in the frame sequence data into a pre-trained neural network model to obtain high-resolution video frame sequence data corresponding to the video to be converted output by the neural network model. The neural network model is configured to obtain the high-resolution video frame sequence data based on high-order pixel information of each frame in the frame sequence data.

In embodiments of the present disclosure, the frame sequence data obtaining unit obtains the frame sequence data of the low-resolution video to be converted, the frame sequence data conversion unit inputs the pixel tensors of each frame in the frame sequence data into the pre-trained neural network, and the neural network model obtains and outputs the high-resolution video frame sequence data based on the high-order pixel information of each frame in the extracted frame sequence data, thereby converting the frame sequence data of the low-resolution video to be converted into high-resolution video frame sequence data. The above technical solution uses the high-order pixel information in the video when converting the video resolution, so that in the process of data processing by the neural network, the image edge and texture information may be effectively preserved, thus realizing the fidelity of the edge and texture information, avoiding excessive smoothness of the image. Therefore, the image is more natural, and the super-resolution visual effect is improved.

Furthermore, the apparatus further includes a neural network model training unit configured to: before obtaining the frame sequence data of the low-resolution video to be converted, obtain frame sequence data of a low-resolution sample video and real high-resolution frame sequence data of the sample video; and determine the frame sequence data of the low-resolution video and the real high-resolution frame sequence data of the sample video as sample data to train an initial neural network model.

Furthermore, the initial neural network model comprises: a high-order pixel feature learning module, a time sequence feature modeling module, a multi-frame up-sampling module, and a high-order pixel loss modeling module connected in sequence.

The high-order pixel feature learning module is configured to calculate high-order pixel information of each frame based on pixel tensors of each frame in the frame sequence data of the sample video, and to obtain feature tensors of each frame in the frame sequence data of the sample video according to the high-order pixel information and the pixel tensors.

The time sequence feature modeling module is configured to perform feature transformation, in a time dimension, on the feature tensors of each frame in the frame sequence data of the sample video, so that the time sequence feature of each frame after the transformation is referred to adjacent frames.

The multi-frame up-sampling module is configured to scale up each frame in the frame sequence data of the sample video based on transformed feature tensors of each frame in the frame sequence data of the sample video to obtain a super-resolution video frame sequence of the sample video.

The high-order pixel loss modeling module is configured to obtain first high-order pixel information of each frame in the super-resolution video frame sequence and second high-order pixel information of each frame in the real high-resolution frame sequence data respectively, and to adjust network parameters to be learned of the neural network model according to a first error between the first high-order pixel information and the second high-order pixel information, and a second error between the pixel tensors of each frame in the super-resolution video frame sequence and the pixel tensors of each frame in the real high-resolution frame sequence data.

Furthermore, the high-order pixel feature learning module includes a high-order pixel information extraction layer and a high-order feature information learning layer.

The high-order pixel information extraction layer is configured to calculate the high-order pixel information of each frame based on the pixel tensors of each frame in the frame sequence data of the sample video.

The high-order feature information learning layer is configured to perform nonlinear transformation on high-order pixel tensors composed of the high-order pixel information and on the pixel tensors to obtain the feature tensors of each frame in the frame sequence data of the sample video.

Furthermore, the neural network model includes multiple composite modules. Each composite module includes the high-order pixel feature learning module and the time sequence feature modeling module connected in sequence. The multiple composite modules are connected in sequence. The time sequence feature modeling module of a last composite module is connected to the multi-frame up-sampling module.

Furthermore, the high-order pixel information extraction layer includes at least one two-dimensional convolution layer having determined convolution weights.

The high-order feature information learning layer includes at least one three-dimensional convolution layer having convolution weights that need to be determined through training.

The time sequence feature modeling module includes at least one three-dimensional convolution layer.

The multi-frame up-sampling module includes the at least one two-dimensional convolution layer whose convolution weights need to be determined through training and a pixel rearrangement layer.

The high-order pixel loss modeling module includes the high-order pixel information extraction layer and a calculating module.

Furthermore, the pre-trained neural network model includes the high-order pixel feature learning module, the time sequence feature modeling module, and the multi-frame up-sampling module connected in sequence.

The high-order pixel feature learning module is configured to calculate the high-order pixel information of each frame based on pixel tensors of each frame in the frame sequence data of the video to be converted, and to obtain feature tensors of each frame in the frame sequence data of the video to be converted according to the high-order pixel information and the pixel tensors.

The time sequence feature modeling module is configured to perform feature transformation, in a time dimension, on the feature tensors of each frame in the frame sequence data of the video to be converted, so that the time sequence feature of each frame after the transformation is referred to adjacent frames.

The multi-frame up-sampling module is configured to scale up each frame in the frame sequence data of the video to be converted based on transformed feature tensors of each frame in the frame sequence data of the video to be converted to obtain high-resolution video frame sequence data of the video to be converted.

Furthermore, the high-order pixel information comprises second derivative information of each pixel point and neighbor pixel points.

The above-mentioned video processing apparatus may execute the video processing method according to any embodiment of the present disclosure, and has the corresponding functional modules and beneficial effects for executing the video processing method.

According to embodiments of the present disclosure, the present disclosure also provides an electronic device and a readable storage medium.

Figure 4:
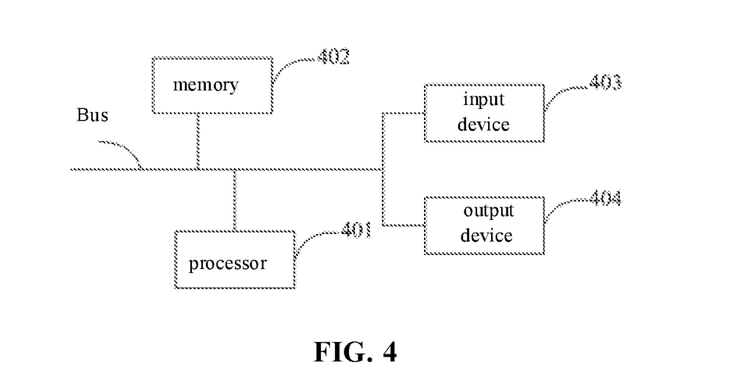
FIG. 4 is a block diagram of an electronic device for implementing the video processing method according to embodiments of the present disclosure.

FIG. 4 is a block diagram illustrating an electronic device to implement the video processing method according to embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 4, the electronic device includes: one or more processors 401, a memory 402, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 401 is taken as an example in FIG. 4.

The memory 402 is a non-transitory computer-readable storage medium according to the present disclosure. The memory stores instructions executable by at least one processor, so that the at least one processor executes the cross-camera obstacle tracking method according to the present disclosure. The non-transitory computer-readable storage medium of the present disclosure stores computer instructions, which are used to cause a computer to execute the video processing method according to the present disclosure.

As a non-transitory computer-readable storage medium, the memory 402 is configured to store non-transitory software programs, non-transitory computer executable programs and modules, such as program instructions/modules corresponding to the cross-camera obstacle tracking method in the embodiment of the present disclosure (For example, the frame sequence data obtaining unit 301 and the frame sequence data conversion unit 302 shown in FIG. 3). The processor 401 executes various functional applications and data processing of the server by running non-transitory software programs, instructions, and modules stored in the memory 402, that is, implementing the video processing method in the foregoing method embodiment.

The memory 402 may include a storage program area and a storage data area, where the storage program area may store an operating system and application programs required for at least one function. The storage data area may store data created according to the use of the electronic device, and the like. In addition, the memory 402 may include a high-speed random access memory, and a non-transitory memory, such as at least one magnetic disk storage device, a flash memory device, or other non-transitory solid-state storage device. In some embodiments, the memory 402 may optionally include a memory remotely disposed with respect to the processor 401, and these remote memories may be connected to the electronic device through a network. Examples of the above network include, but are not limited to, the Internet, an intranet, a local area network, a mobile communication network, and combinations thereof.

The electronic device for implementing the video processing method may further include: an input device 403 and an output device 404. The processor 401, the memory 402, the input device 403, and the output device 404 may be connected through a bus or in other manners. In FIG. 4, the connection through the bus is taken as an example.

The input device 403 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 804 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the technical solution of the embodiments of the present disclosure, frame sequence data of a low-resolution video to be converted is obtained, the pixel tensors of each frame in the frame sequence data into the pre-trained neural network model, and then the neural network model obtains and outputs the high-resolution video frame sequence data based on the high-order pixel information of each frame in the extracted frame sequence data, thereby converting the low-resolution video frame sequence data to be converted into the high-resolution video frame sequence data. The above technical solution uses the high-order pixel information of the video to convert the video resolution, so that the neural network can effectively retain the image edge and texture information during data processing, thereby realizing fidelity of image edge and texture information and avoiding excessive smoothness of images. Therefore, the image is more natural, and the super-resolution visual effect is improved.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A video processing method, comprising:
   obtaining frame sequence data of a low-resolution video to be converted; and
   inputting pixel tensors of each frame in the frame sequence data into a pre-trained neural network model to obtain high-resolution video frame sequence data corresponding to the video to be converted output by the neural network model, wherein the neural network model obtains the high-resolution video frame sequence data based on high-order pixel information of each frame in the frame sequence data;
   wherein the pre-trained neural network model comprises:
      a high-order pixel feature learning module, a time sequence feature modeling module, and a multi-frame up-sampling module connected in sequence;
   the high-order pixel feature learning module is configured to obtain high-order pixel information of each frame based on pixel tensors of each frame in the frame sequence data of the video to be converted, and to obtain feature tensors of each frame in the frame sequence data of the video to be converted according to the high-order pixel information and the pixel tensors;
   the time sequence feature modeling module is configured to perform feature transformation, in a time dimension, on the feature tensors of each frame in the frame sequence data of the video to be converted, to enable the time sequence feature of each frame after the transformation to be referred to adjacent frames;
   the multi-frame up-sampling module is configured to scale in each frame in the frame sequence data of the video to be converted based on transformed feature tensors of each frame in the frame sequence data of the video to be converted to obtain high-resolution video frame sequence data of the video to be converted.

2. The method according to claim 1, wherein the method further comprises:
   obtaining frame sequence data of a low-resolution sample video and real high-resolution frame sequence data of the sample video; and
   determining the frame sequence data of the low-resolution sample video and the real high-resolution frame sequence data of the sample video as sample data to train an initial neural network model.

3. The method according to claim 2, wherein the initial neural network model comprises: a high-order pixel feature learning module, a time sequence feature modeling module, a multi-frame up-sampling module, and a high-order pixel loss modeling module connected in sequence, and
   the high-order pixel feature learning module is configured to obtain high-order pixel information of each frame based on pixel tensors of each frame in the frame sequence data of the sample video, and to obtain feature tensors of each frame in the frame sequence data of the sample video according to the high-order pixel information and the pixel tensors;

the time sequence feature modeling module is configured to perform feature transformation, in a time dimension, on the feature tensors of each frame in the frame sequence data of the sample video, to enable the time sequence feature of each frame after the transformation to be referred to adjacent frames;

the multi-frame up-sampling module is configured to scale up each frame in the frame sequence data of the sample video based on transformed feature tensors of each frame in the frame sequence data of the sample video to obtain a super-resolution video frame sequence of the sample video; and the high-order pixel loss modeling module is configured to obtain first high-order pixel information of each frame in the super-resolution video frame sequence and second high-order pixel information of each frame in the real high-resolution frame sequence data respectively, and to adjust network parameters to be learned of the neural network model according to a first error between the first high-order pixel information and the second high-order pixel information, and a second error between the pixel tensors of each frame in the super-resolution video frame sequence and the pixel tensors of each frame in the real high-resolution frame sequence data.

4. The method according to claim 3, wherein the high-order pixel feature learning module comprises:

a high-order pixel information extraction layer, configured to obtain the high-order pixel information of each frame based on the pixel tensors of each frame in the frame sequence data of the sample video; and a high-order feature information learning layer, configured to perform nonlinear transformation on high-order pixel tensors composed of the high-order pixel information and on the pixel tensors to obtain the feature tensors of each frame in the frame sequence data of the sample video.

5. The method according to claim 4, wherein the high-order pixel information extraction layer comprises at least one two-dimensional convolution layer having determined convolution weights;

the high-order feature information learning layer comprises at least one three-dimensional convolution layer having convolution weights that need to be determined through training;

the time sequence feature modeling module comprises at least one three-dimensional convolution layer;

the multi-frame up-sampling module comprises the at least one two-dimensional convolution layer having convolution weights that need to be determined through training and a pixel rearrangement layer; and the high-order pixel loss modeling module comprises the high-order pixel information extraction layer and a calculating module.

6. The method according to claim 3, wherein the neural network model comprises a plurality of composite modules, each composite module comprises the high-order pixel feature learning module and the time sequence feature modeling module connected in sequence, the plurality of composite modules are connected in sequence, and the time sequence feature modeling module of a last composite module is connected to the multi-frame up-sampling module.

7. The method according to claim 1, wherein the high-order pixel information comprises second derivative information of each pixel point and neighbor pixel points.

8. An electronic device, comprising:

at least one processor; and a memory, communicatively connected to the at least one processor; wherein, the memory is configured to store instructions executable by the at least one processor, when the instructions are executed by the at least one processor, the at least one processor is caused to:

obtain frame sequence data of a low-resolution video to be converted; and input pixel tensors of each frame in the frame sequence data into a pre-trained neural network model to obtain high-resolution video frame sequence data corresponding to the video to be converted output by the neural network model, wherein the neural network model obtains the high-resolution video frame sequence data based on high-order pixel information of each frame in the frame sequence data;

wherein the pre-trained neural network model comprises: a high-order pixel feature learning module, a time sequence feature modeling module, and a multi-frame up-sampling module connected in sequence;

the high-order pixel feature learning module is configured to obtain high-order pixel information of each frame based on pixel tensors of each frame in the frame sequence data of the video to be converted, and to obtain feature tensors of each frame in the frame sequence data of the video to be converted according to the high-order pixel information and the pixel tensors;

the time sequence feature modeling module is configured to perform feature transformation, in a time dimension, on the feature tensors of each frame in the frame sequence data of the video to be converted, to enable the time sequence feature of each frame after the transformation to be referred to adjacent frames;

the multi-frame up-sampling module is configured to scale in each frame in the frame sequence data of the video to be converted based on transformed feature tensors of each frame in the frame sequence data of the video to be converted to obtain high-resolution video frame sequence data of the video to be converted.

9. The electronic device according to claim 8, wherein the at least one processor is caused to further:

obtain frame sequence data of a low-resolution sample video and real high-resolution frame sequence data of the sample video; and determine the frame sequence data of the low-resolution sample video and the real high-resolution frame sequence data of the sample video as sample data to train an initial neural network model.

10. The electronic device according to claim 9, wherein the initial neural network model comprises: a high-order pixel feature learning module, a time sequence feature modeling module, a multi-frame up-sampling module, and a high-order pixel loss modeling module connected in sequence, and the high-order pixel feature learning module is configured to obtain high-order pixel information of each frame based on pixel tensors of each frame in the frame sequence data of the sample video, and to obtain feature tensors of each frame in the frame sequence data of the sample video according to the high-order pixel information and the pixel tensors;

the time sequence feature modeling module is configured to perform feature transformation, in a time dimension, on the feature tensors of each frame in the frame sequence data of the sample video, to enable the time sequence feature of each frame after the transformation to be referred to adjacent frames;

the multi-frame up-sampling module is configured to scale up each frame in the frame sequence data of the sample video based on transformed feature tensors of each frame in the frame sequence data of the sample video to obtain a super-resolution video frame sequence of the sample video; and the high-order pixel loss modeling module is configured to obtain first high-order pixel information of each frame in the super-resolution video frame sequence and second high-order pixel information of each frame in the real high-resolution frame sequence data respectively, and to adjust network parameters to be learned of the neural network model according to a first error between the first high-order pixel information and the second high-order pixel information, and a second error between the pixel tensors of each frame in the super-resolution video frame sequence and the pixel tensors of each frame in the real high-resolution frame sequence data.

11. The electronic device according to claim 10, wherein the high-order pixel feature learning module comprises:
a high-order pixel information extraction layer, configured to obtain the high-order pixel information of each frame based on the pixel tensors of each frame in the frame sequence data of the sample video; and
a high-order feature information learning layer, configured to perform nonlinear transformation on high-order pixel tensors composed of the high-order pixel information and on the pixel tensors to obtain the feature tensors of each frame in the frame sequence data of the sample video.

12. The electronic device according to claim 11, wherein the high-order pixel information extraction layer comprises at least one two-dimensional convolution layer having determined convolution weights;
the high-order feature information learning layer comprises at least one three-dimensional convolution layer having convolution weights that need to be determined through training;
the time sequence feature modeling module comprises at least one three-dimensional convolution layer;
the multi-frame up-sampling module comprises the at least one two-dimensional convolution layer having convolution weights that need to be determined through training and a pixel rearrangement layer; and
the high-order pixel loss modeling module comprises the high-order pixel information extraction layer and a calculating module.

13. The electronic device according to claim 10, wherein the neural network model comprises a plurality of composite modules, each composite module comprises the high-order pixel feature learning module and the time sequence feature modeling module connected in sequence, the plurality of composite modules are connected in sequence, and the time sequence feature modeling module of a last composite module is connected to the multi-frame up-sampling module.

14. The electronic device according to claim 8, wherein the high-order pixel information comprises second derivative information of each pixel point and neighbor pixel points.

15. A non-transitory computer-readable storage medium, having computer programs stored thereon, wherein when the computer programs are executed, the computer is caused to execute the video processing method, the video processing method comprising:
obtaining frame sequence data of a low-resolution video to be converted; and
inputting pixel tensors of each frame in the frame sequence data into a pre-trained neural network model to obtain high-resolution video frame sequence data corresponding to the video to be converted output by the neural network model, wherein the neural network model obtains the high-resolution video frame sequence data based on high-order pixel information of each frame in the frame sequence data;
wherein the pre-trained neural network model comprises: a high-order pixel feature learning module, a time sequence feature modeling module, and a multi-frame up-sampling module connected in sequence;
the high-order pixel feature learning module is configured to obtain high-order pixel information of each frame based on pixel tensors of each frame in the frame sequence data of the video to be converted, and to obtain feature tensors of each frame in the frame sequence data of the video to be converted according to the high-order pixel information and the pixel tensors;
the time sequence feature modeling module is configured to perform feature transformation, in a time dimension, on the feature tensors of each frame in the frame sequence data of the video to be converted, to enable the time sequence feature of each frame after the transformation to be referred to adjacent frames;
the multi-frame up-sampling module is configured to scale in each frame in the frame sequence data of the video to be converted based on transformed feature tensors of each frame in the frame sequence data of the video to be converted to obtain high-resolution video frame sequence data of the video to be converted.

16. The non-transitory computer-readable storage medium according to claim 15, wherein the method further comprises:
obtaining frame sequence data of a low-resolution sample video and real high-resolution frame sequence data of the sample video; and
determining the frame sequence data of the low-resolution sample video and the real high-resolution frame sequence data of the sample video as sample data to train an initial neural network model.

17. The non-transitory computer-readable storage medium according to claim 16, wherein the initial neural network model comprises: a high-order pixel feature learning module, a time sequence feature modeling module, a multi-frame up-sampling module, and a high-order pixel loss modeling module connected in sequence, and
the high-order pixel feature learning module is configured to obtain high-order pixel information of each frame based on pixel tensors of each frame in the frame sequence data of the sample video, and to obtain feature tensors of each frame in the frame sequence data of the sample video according to the high-order pixel information and the pixel tensors;
the time sequence feature modeling module is configured to perform feature transformation, in a time dimension, on the feature tensors of each frame in the frame sequence data of the sample video, to enable the time sequence feature of each frame after the transformation to be referred to adjacent frames;

the multi-frame up-sampling module is configured to scale up each frame in the frame sequence data of the sample video based on transformed feature tensors of each frame in the frame sequence data of the sample video to obtain a super-resolution video frame sequence of the sample video; and the high-order pixel loss modeling module is configured to obtain first high-order pixel information of each frame in the super-resolution video frame sequence and second high-order pixel information of each frame in the real high-resolution frame sequence data respectively, and to adjust network parameters to be learned of the neural network model according to a first error between the first high-order pixel information and the second high-order pixel information, and a second error between the pixel tensors of each frame in the super-resolution video frame sequence and the pixel tensors of each frame in the real high-resolution frame sequence data.

18. The non-transitory computer-readable storage medium according to claim 17, wherein the high-order pixel feature learning module comprises:

a high-order pixel information extraction layer, configured to obtain the high-order pixel information of each frame based on the pixel tensors of each frame in the frame sequence data of the sample video; and a high-order feature information learning layer, configured to perform nonlinear transformation on high-order pixel tensors composed of the high-order pixel information and on the pixel tensors to obtain the feature tensors of each frame in the frame sequence data of the sample video.

* * * * *